| United States Patent [19] | [11] | Patent Number: | 4,607,594 |
|---|---|---|---|
| Thacker | [45] | Date of Patent: | Aug. 26, 1986 |

[54] ANIMAL LITTER

[75] Inventor: Craig E. Thacker, McConnelsville, Ohio

[73] Assignee: Raetec Industries, Inc., McConnelsville, Ohio

[21] Appl. No.: 690,723

[22] Filed: Jan. 11, 1985

[51] Int. Cl.$^4$ .............................................. A01K 1/015
[52] U.S. Cl. ...................................................... 119/1
[58] Field of Search ............................................ 119/1

[56] References Cited

U.S. PATENT DOCUMENTS

| 3,425,397 | 2/1969 | Schulein et al. | 119/1 |
|---|---|---|---|
| 3,675,625 | 7/1972 | Miller et al. | 119/1 |
| 3,765,371 | 10/1973 | Fisher | 119/1 |
| 3,921,581 | 11/1975 | Brewer | 119/1 |
| 4,278,047 | 7/1981 | Lucà | 119/1 |
| 4,341,180 | 7/1982 | Cortigene et al. | 119/1 |
| 4,459,368 | 7/1984 | Jaffee et al. | 119/1 X |

Primary Examiner—Robert P. Swiatek
Attorney, Agent, or Firm—Mueller and Smith

[57] ABSTRACT

Disclosed is a granular absorbent composition which is ideally suited as an animal litter. Such composition comprises a mixture of absorbent particles (e.g. cellulosic material or clay) and inert adsorptive granules (e.g. volcanic rock) which have been treated with a neutralizing agent (a carbonate, bicarbonate, or hydrogen phosphate).

15 Claims, No Drawings

ANIMAL LITTER

BACKGROUND OF THE INVENTION

The present invention relates to granular absorbents and more particularly to a granular absorbent which contains a neutralizing agent and is ideally suited for use as an animal litter.

A wide variety of granular absorbents have been proposed for use as animal litter. Typical granular absorbent material include cellulosic materials, such as, sawdust, wood chips, wood shavings, oat hulls, alfalfa (usually pressed or aggolmerated); or clay minerals, such as, kaolinites or montmorillonites. Unfortunately, such materials develop malodors rapidly when used as an animal litter.

Various attempts have been made to mask the odor expressed by granular animal litter, most typically involving the addition of a fragrance or deodorizer to the granular material. However, the fragrance or deodorizer is released continually and soon is exhausted. Another approach has been to provide a moisture sensitive release of fragrance. For example, U.S. Pat. No. 3,921,581 proposes a solid excipient having a water-sensitive disintegrant. The solid excipient is designed to disintigrate when the animal litter is moistened by urine. This animal litter, however, provides little or no oder masking for feces, and after a period of some use by the animal tends to develop moist clumps of disintegrated particles. A slightly more sophisticated approach is proposed in U.S. Pat. No. 4,407,231 which proposes an animal litter of absorbent particles which particles bear on their exterior surfaces frangible microcapsules which contain a fragrance or deodorizer. Known cellulosic materials, synthetic clays, and clay minerals are proposed. The fragrance or deodorizer is shown to be a perfume, flavor, fragrance, essence, oil, or deodorizer, preferably one which is fairly volatile, including citrus (orange or lemon) oil, oil of cloves, cinnamon oil, pine oil, or the like.

Heretofore, perlite, optionally admixed with clay, has been proposed for use in concrete, plaster, building forms, and the like. For example, U.S. Pat. Nos. 2,699,409 and 2,728,723 propose to use clay to agglomerate perlite fines, which agglomerate is suitable for use in concrete, plaster, building forms, etc. Alternatively, U.S. Pat. No. 2,778,744 proposes a granular odorant for use in bathrooms an other houshold rooms which odorant composition is composed of attapulgite, vermiculite, sawdust, or Fuller's earth, which material bears absorbed liquid odorant such as neutroleum alpha.

U.S. Pat. No. 2,884,380 proposes a molded thermal insulation composed of perlite, montmorillonite clay, an organic binder of polyvinyl acetate or emulsified asphalt, and silicone. U.S. Pat. No. 3,132,956 proposes an acoustical tile of perlite, optionally admixed with vermiculite, expanded clay, mineral wood, glass wood, artificially expanded glass, ceramic, or the like. The tile composition additionally contains a clay binder and the mixture is fired to cause a thin coating of clay to adhere to and bind the granular material into the acoustical tile form. U.S. Pat. No. 3,010,835 proposes a castable refractory mix of perlite, rock kyanite, calcined flint fire clay, and calcium aluminate cement. Canadian Pat. No. 835,822 proposes a method of making expanded perlite aggregates by firing at a temperature of 1600°–2400° F. a mixture of perlite, clay, and an alkali metal silicate flux. The aggregates are used to make lightweight structural panels. Canadian Pat. No. 835,823 proposes the same structural panel composition, except that the flux is omitted from the composition being fired.

BROAD STATEMENT OF THE INVENTION

The present invention provides a granular absorbent composition which is particularly useful as an animal litter and which is a substantial improvement over prior art litters. The granular absorbent composition of the present invention comprises an admixture of absorbent particles and inert adsorptive granules which have been treated with an neutralizing agent. The neutralizing agent advantageously is capable of reacting with urine and preferably is a carbonate, bicarbonate, or hydrogen phosphate. Absorbent particles advantageously will be made from cellulosic material or from clay. Advantageous inert adsorptive granules will be volcanic rock.

Another aspect of the present invention is a method for making a granular absorbent composition. Such method comprises treating inert adsorptive granules with a neutralizing agent followed by admixing the treated adsorptive granules with absorbent particles.

Advantages of the present invention include an animal litter which is long lasting, quite absorbent, and which neutralizes odor-causing urine selectively during use of the litter by an animal. A further advantage is an animal litter which possesses increased "scratchability" for cats. Another advantage is a product which coats solid waste material for dehydration and odor control thereof. These and other advantages will be readily apparent to those skilled in the art based upon the disclosure contained herein.

DETAILED DESCRIPTION OF THE INVENTION

The unique granular absorbent composition of the present invention will be described with reference to its use as an animal litter, particularly for use by cats; although, it must be recognized that the granular absorbent composition of the present invention finds use as a hamster or gerbil litter, parakeet and other small bird litter and the like litter uses. Additionally, the granular absorbent composition is ideal for absorbing spills on upholstery and carpets and assists in neutralizing and deodorizing such spills. The composition also may be used as a garbage can absorbent and deodorizer. Further, the granular absorbent finds use in treating grease and oil spills, and is an excellent fire retardant and liner for charcoal grills. The composition further provides an excellent traction base for ice and snow, or can be used as a potted plant base. These and a variety of other uses will be readily apparent.

The granular absorbent composition of the present invention is comprised of three main ingredients. Referring to the absorbent particles, conventional absorbent particles which have heretofore been proposed in the animal litter and other arts are the prime agent for absorbing liquid fluids, such as urine. A wide variety of materials are known and useful as the absorbent particles, which particles may take the form of various regular or irregular shapes and sizes. For example, absorbent particles may be composed of natural or processed cellulosic materials, such as, for example, sawdust, wood chips, wood shavings, oat hulls, alfalfa (usually pressed or agglomerated) and various other dried grasses, corn cobs, dried fruit peel, peanut and other nut shells, newspaper material, and the like. Certain absorbent synthetic fibers may find use as suitable material for the absorbent particles additionally.

Alternatively, and preferably, absorbent particles will be derived from various clay minerals (e.g. diatomaceous earths), such as, for example, bentonite, montmorillonite, kaolin or kaolinite, attapulgite, or the like. Synthetic clays may find use as absorbent particles also. The preferred clay absorbent particles will be derived from attapulgite clay which possesses remarkably high absorptive properties. Additionally, attapulgite clay is lower in density than other conventional clays and, thus, more product per unit weight can be provided in the granular absorbent composition of the present invention. Commercial attapulgite clay typically has undergone extensive high-temperature drying which makes it highly resistant to flocculation or caking during prolonged contact with aqueous fluids.

It should be noted that the treatment of the absorbent particles with a neutralizing atent, perfumant, or other odorant is not preferred since such treatment would reduce the absorptive capacity of the absorbent particles. For this reason, the granular absorbent composition of the present invention contains inert adsorptive granules which have been treated with a neutralizing agent. The inert carrier should express adsorptive rather than absorptive capability in order to ensure the neutralization of the urine before it is absorbed by the absorbent particles. The preferred inert adsorptive granules will be derived from volcanic rock or volcanic glass, such as, for example, perlite. It should be recognized, however, that certain man-made inert carriers such as various expanded polymers, plastics, or glasses may find use as an inert adsorptive granule in accordance with the precepts of the present invention. Volcanic rock or glass, e.g. perlite ore, can be quickly heated to a temperature above about 871° C. to cause the rock to "pop" in a manner similar to popcorn. Such thermal expansion of the material creates a particle expansion approximately 20 times its volume. The resulting product is extremely light in weight and low in density. The expanded volcanic rock additionally contains countless fractured bubbles at the surface of each particle which greatly increases the total surface area of the particle and creates a heavily textured product. The closed cell structure of the particle further creates a substance of high volume and low density. The inert adsorptive granules tend to absorb fluid on the surface rather than absorb fluid into their interiors.

Highly porous, inert, adsorptive granules add fluff to the granular absorbent composition, thus enabling quick absorption of fluids by the absorptive clay or other particles, which, in turn, reduces and eliminates periodic wet spots within the composition when it is used as an animal litter. The increased rate of absorption and reduction of wet spots also contributes to reduced lengths of time to which the animal wastes are exposed to the atmosphere with its consequent decomposition and subsequent release of odors by the waste. An additional advantage of perlite it that it quickly adheres to the surface of fresh sold animal waste, thus reducing the surface area of the waste exposed to oxygen which is needed in bacterial and disassociative atmospheric decomposition. The adsorptive qualities of perlite additionally contribute to a quick drying of the solids. It is to be noted that the absorbent clay or other particles are enabled to absorb fluids from the inert adsorptive granules which further increases the rate of drying of solid animal wastes.

The preferred perlite inert adsorptive granules additionally provide a unique texture to the granular absorbent composition which contributes to its "scratchability", especially for cats. The increased scratchability of the granular absorbent composition tends to cause cats to bury their wastes in the composition, thus further reducing the exposure of the wastes to the atmosphere and increasing the coating of such wastes with the inert adsorptive granules.

As noted above, the inert adsorptive granules are treated with a neutralizing agent. A variety of neutralizing agents can be envisioned, depending upon the precise intended use of the granular absorbent composition of the present invention. In animal litter uses, appropriate neutralizing agents will be capable of reacting with urine, which is composed mainly of urea. Such chemical reaction forms a highly insoluble ammonia salt which means that the urine will not cause an odor, even when the animal litter is used for extended periods of time. Appropriate neutralizing agents, then, include carbonates, bicarbonates, hydrogen phosphates, and other amphoteric neutralizing agents. Advantageous neutralizing agents include alkali metal and aklaline earth metal carbonates, bicarbonates, and hydrogen phosphates, such as, for example, sodium carbonate, calcium carbonate, sodium bicarbonate, calcium bicarbonate, calcium dihydrogen phosphate, and the like and even mixtures thereof.

The advantages garnered by use of the preferred amphoteric compounds as neutralizers in the animal litter of the present invention will be appreciated even more based upon the following discussion. The average pH range of cat urine is from about 6 to 7 (slightly acidic to neutral). Free ammonia and hydrolyzed ammonia exist in fresh urine in only trace amounts. Urine undergoes microbial decomposition to release ammonia gas to the atmosphere, thus causing the characteristic noxious odor emitted by conventional animal litters. The preferred amphoteric neutralizing agents can effectively neutralize cat urine before decomposition when it is slightly acidic, during microbial decomposition when the pH of the urine is being raised, and after decomposition when the urine becomes neutral to slightly basic. The use of the preferred amphoteric neutralizing agents of the present invention is a substantial departure from the prior art. It will be appreciated that the use of the neutralizing agent on the exterior surfaces of the inert granular particles enables the neutralizing agent to be dissolved with the urine and thence absorbed into the interior of the litter base particles, further ensuring sufficient neutralization during all stages of urine decomposition. As a result of the effective neutralization of the urine, the requirement of perfume masking agents is eliminated.

Based upon the stoichiometry of the neutralization reaction of, for example, aqueous sodium bicarbonate and urea to form carbon dioxide gas, ammonium carbonate, and sodium hydroxide, just under 1½ grams of sodium bicarbonate will be required for neutralization of one gram of urea contained in the cat urine. The average adult cat will discharge approximately 30 milliliters of urine per day and within that volume there is an average of about 10 milligrams of urea present. To effect neutralization of the urea produced during an average lifespan of about 3 to 5 days (per 10 pounds of litter), between 42 and 70 milligrams of the sodium bicarbonate per 10 pounds of litter would be required. To account for the possibility of more than one animal using the litter box, to compensate for both the dispersion and dilution ratios expected, and to increase the absorbency potential of the litter base, the animal litter of the present invention advantageously will utilize from between about 150 grams to about 226 grams of sodium bicarbonate per 10 pounds of litter. Broadly, then, the proportion of treated inert adsorptive granules should range from between about 5 to 50 volume percent by weight of the litter composition, advantageously between about 10 and 40 percent, and preferably the preferred sodium bicarbonate-treated perlite should range from between about 22 to 27 percent. Finally, the advantages of using inert adsorptive particles different in composition from the base absorptive litter particles can be appreciated from the disclosure contained herein. It should be noted, however, that the use of only absorptive particles, a fraction of which have been treated with the neutralizing agents disclosed herein provides an animal litter which is a substantial improvement over prior art litters. While not preferred, such animal litter composition is within the broad precepts of the present invention.

The size of the inert carrier particles broadly should range from between about 325 to 4 mesh (U.S. Standard Sieves Series), and advantageously from between about 200 to 6 mesh. The preferred perlite particles will range from between about 100 to 8 mesh size.

While the neutralizing agent can be dispersed in a suitable solvent, e.g. water or alcohol, and added to the inert adsorptive granules, the capacity of the adsorbent capacity of the granules would be reduced through the reduction of porosity thereof. Advantageously, then, in order to effect a greater and more uniform dispersal of the neutralizing agent onto the adsorptive granules, the neutralizing agent will be bonded to or crystalized onto the granules. Such crystalization or bonding onto the granules preferably involves the crystalization of such neutralizing agent from solution onto the granules by conventional techniques of which those skilled in the art will be well aware. Preferably, all of the exterior surfaces of the inert adsorptive granules will be coated with the neutralizing agent, though a less complete coating of the granules can be tolerated.

As noted above, the prime odor problem of urine results from the microbial decomposition of urea into ammonia. Bacteria naturally occurring in urine and fecal wastes include, various coliforms, e.g. *Escherochia coli, Enterobacter aerogenes,* other aerobic bacilli and the like; certain gram-positive cocci, e.g. *Streptococcus faecalis,* Staphylococcus forms; endospore-forming rods and cocci, e.g. *Clostridium perfringens;* certain methane-producing bacteria often present; and pathogens that may be present as a result of sick and infested animals utilizing the litter box. In order to combat the natural microbial decomposition forces at work in the litter, the litter of the present invention advantageously utilizes certain bacteriostatic agents to retard the growth of the bacterial population and, thus, retard the amount and speed of subsequent decompositions. By retarding the growth of the bacteria population, the neutralizing agent can more readily accomplish its intended purpose. Conventional bacteriostats or bacteriocides, fungistats or fungicides, which may be used include, for example, benzalkonium compounds (e.g. benzalkonium chloride), de-colorized iodine compounds, provodone iodines, and the like and mixtures thereof. The preferred benzalkonium chloride should be used in ranges which avoid harm to the animals or exceed safe toxicity levels. Such proportions generally range from between about 1 and 400 parts per million per one pound of animal litter. Advantageously benzalkonium chlorides are used in a range of between about 10 and 200 ppm per one pound of cat litter and preferably from between about 25 and 75 ppm.

As mentioned above, fecal waste odor control also is provided by the animal litter of the present invention. Physical action imparted by the animal litter includes the quick adherence of the inert carrier particles to the fecal wastes followed by the physical action of dehydration caused thereby. Dehydration of fecal wastes reduces and retards microbial decomposition of the solids, thus reducing odor formation. Next, the neutralizing agent adhering to the inert carrier particles begins the neutralization process as the moisture of the fecal waste is removed. Finally, the preferred use of various bacteriostatic agents also retard microbial decomposition of fecal wastes which contributes to the elimination of objectionable odors.

Finally, most natural and synthetic absorptive particles develop a natural musty odor when contacted by water. Such mustiness becomes more apparent when using the animal litter of the present invention because of the effective neutralization of animal wastes accomplished by the litter. While such mustiness is not an objectionable odor, it may be advantageous on occasion to add a light perfume in dilute proportions in order to compensate for such earth or musty odor exhibited by the litter. Such perfumes include, for example, lilac or lavendar fragrances and preferably a natural lavendar select oil is used.

The granular absorbent composition does not tend to cling to animals when used as an animal litter, and thus the composition may be termed "trackless". Additionally, full utilization of the entire litter within the box is encouraged since the pet is not turned away by any offensive odors being emitted therefrom. While the invention has been described in connection with specific embodiments thereof, it will be understood that it is capable of further modification and, this application is intended to cover such variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and limits of the appended claims. All citations referred to herein are expressly incorporated herein by reference.

I claim:

1. An granular absorbent composition comprising a mixture of:
    (a) absorbent particles selected from the group consisting of cellulosic material, clay, diatomaceous earth, and mixtures thereof; and
    (b) inert adsorptive granules selected from the group consisting of porous polymeric granules, man-made glass, volcanic rock, and mixtures thereof, only said adsorptive granules having been treated with a neutralizing agent selected from the group consisting of a carbonate, a bicarbonate, a hydrogen phosphate, and like amphoteric neutralizing agents capable of reacting with urine.

2. The granular absorbent composition of claim 1 wherein said neutralizing agent is a carbonate, bicarbonate, or hydrogen phosphate.

3. The granular absorbent composition of claim 1 wherein said cellulosic material is selected from the group consisting of sawdust, wood chips, wood shavings, oat hulls, dried grass, corn cobs, dried fuit peel, nut shells, newspaper, and mixtures thereof.

4. The granular absorbent composition of claim 1 wherein said clay is selected from the group consisting of bentonite, montmorillonite, kaolin, or attapulgite, and mixtures thereof.

5. The granular absorbent composition of claim 1 wherein said inert absorptive granules comprise volcanic rock.

6. The granular absorbent composition of claim 5 wherein said volcanic rock comprises perlite.

7. The granular absorbent composition of claim 1 wherein said inert adsorptive granules comprise porous polymeric granules or porous glass granules.

8. The granular absorbent composition of claim 1 which additionally contains an agent selected from the group consisting of a bacteriostat, a fungistat, an odorant, and mixtures thereof.

9. The granular absorption composition of claim 1 which additionally contains a bacteriostat.

10. A granular absorbent composition comprising a mixture of:
    (a) absorbent particles selected from the group consisting of cellulosic material, a clay, a diatomaceous earth, and mixtures thereof; and
    (b) inert adsorptive granules of volcanic rock, only said absorptive granules having been treated with a neutralizing agent capable of reacting with urine and selected from the group consisting of a carbonate, bicarbonate, hydrogen phosphate, and mixtures thereof.

11. The granular absorbent composition of claim 10 wherein said clay is selected from the group consisting of bentonite, montmorillonite, kaolin, attapulgite, and mixtures thereof.

12. The granular absorbent composition of claim 10 wherein said volcanic rock comprises perlite.

13. The granular absorbent of claim 10 wherein said absorbent is clay and said volcanic rock is perlite.

14. A method for making a granular absorbent composition which comprises:
    (a) treating only inert adsorptive granules selected from the group consisting of porous polymeric granules, man-made glass, volcanic rock, and mxtures thereof, with a neutralizing agent selected from the group consisting of a carbonate, bicarbonate, hydrogen phosphate, and mixtures thereof; and
    (b) admixing said treated adsorptive granules with absorbent particles selected from the group consisting of cellulosic material, a clay, a diatomaceous earth, and mixtures thereof.

15. The method of claim 14 wherein said inert adsorptive granules comprise volcanic rock.

* * * * *